Sept. 14, 1954  N. S. REED  2,689,039
MANUFACTURE OF ELECTRIC CABLES
Filed Jan. 31, 1951  3 Sheets-Sheet 1
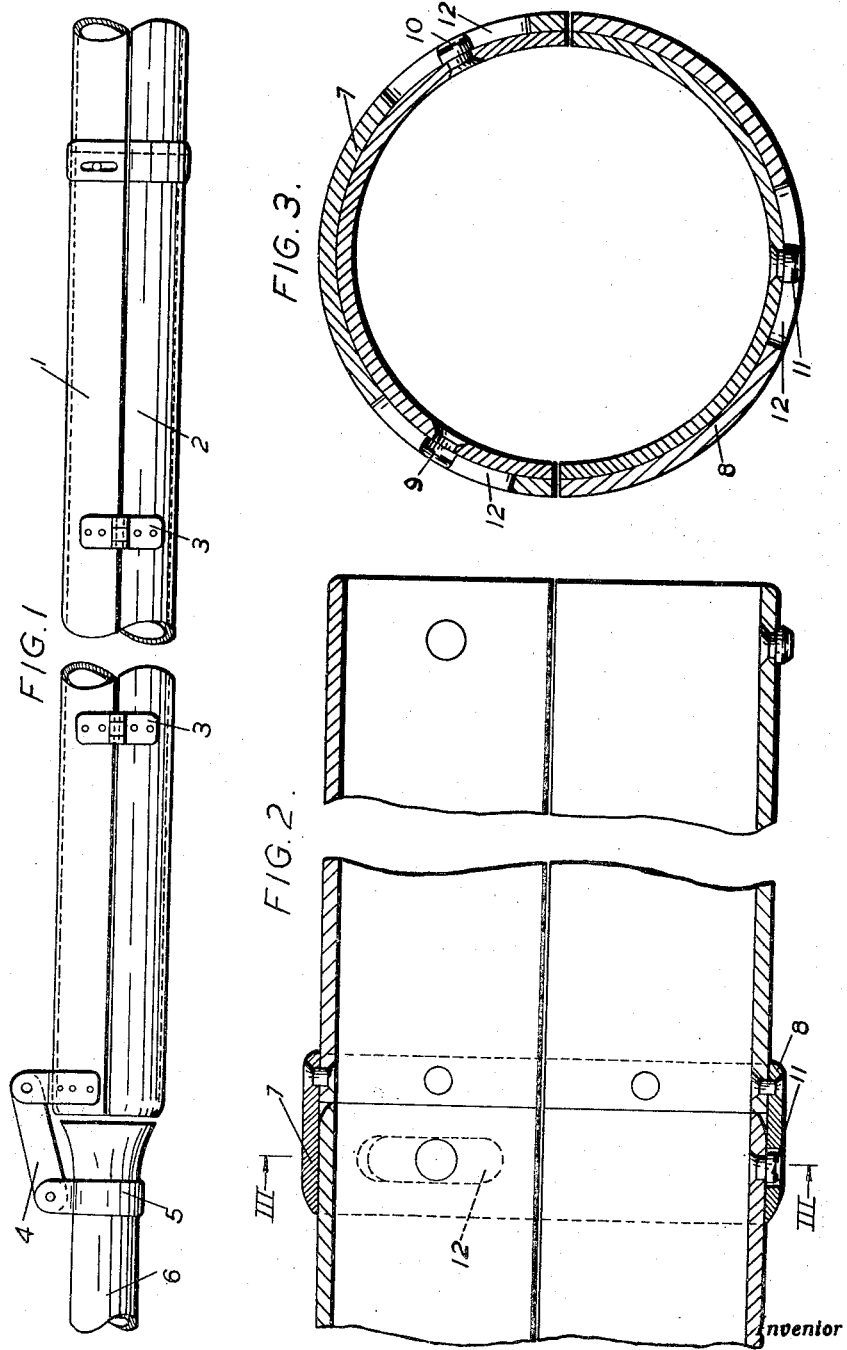
Inventor
Neville Stanley Reed
By
Attorneys

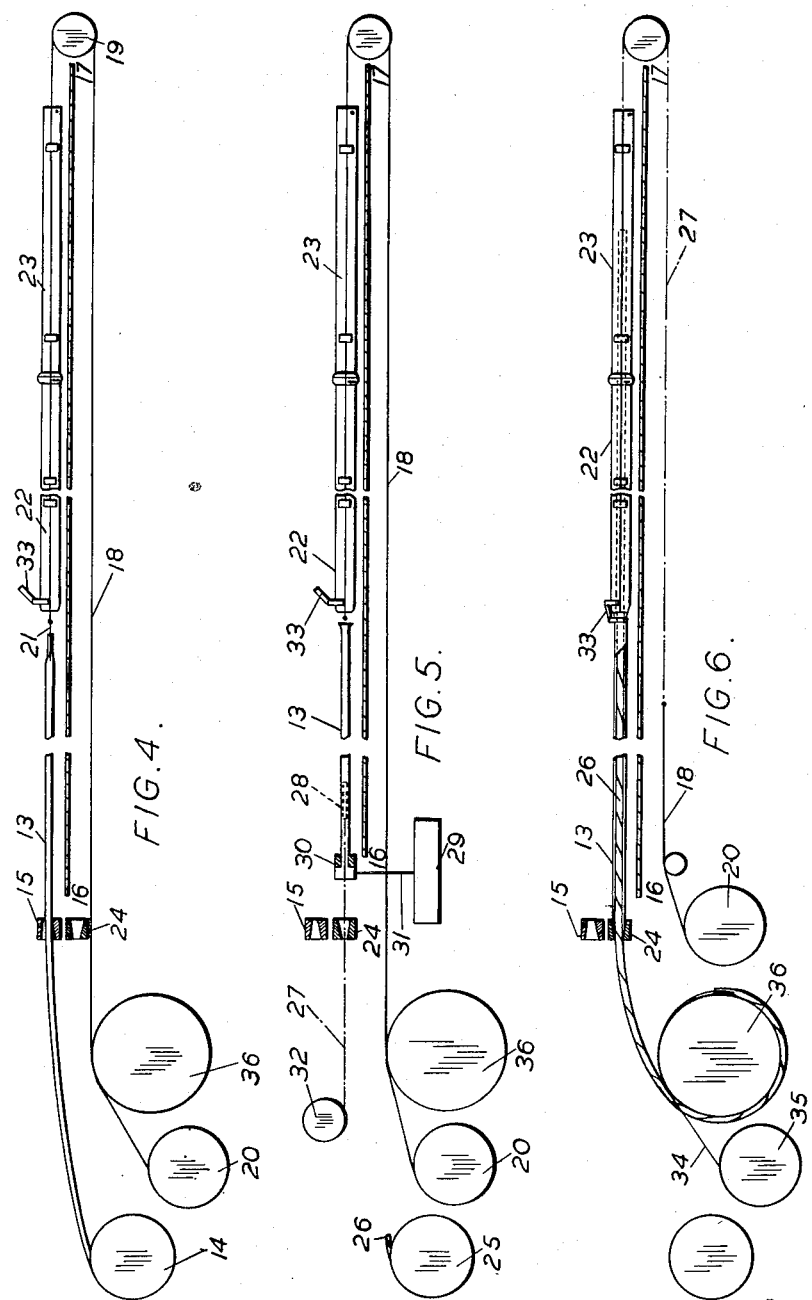

Sept. 14, 1954  N. S. REED  2,689,039
MANUFACTURE OF ELECTRIC CABLES
Filed Jan. 31, 1951  3 Sheets-Sheet 3
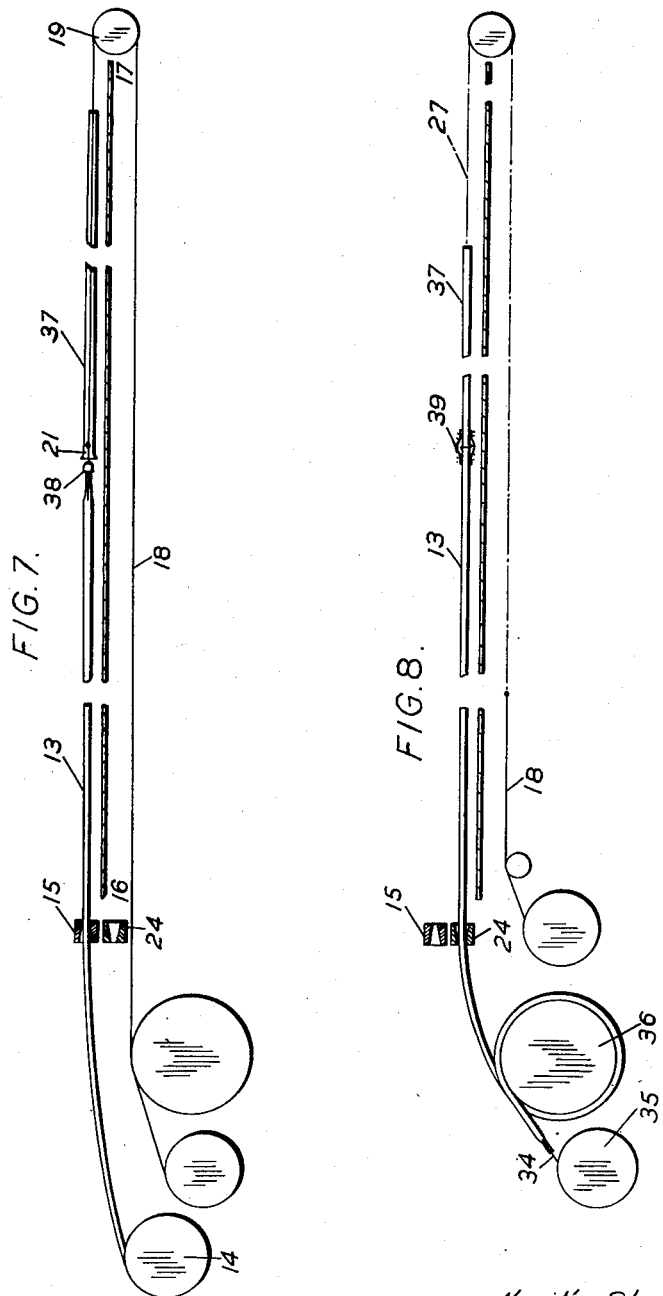
Inventor
Neville Stanley Reed
By Vooרes Leonard Shen
Attorneys Patented Sept. 14, 1954

2,689,039

UNITED STATES PATENT OFFICE 2,689,039

MANUFACTURE OF ELECTRIC CABLES

Neville Stanley Reed, London, England, assignor to British Insulated Callender's Cables Limited, London, England, a British company Application January 31, 1951, Serial No. 208,793

Claims priority, application Great Britain February 9, 1950

2 Claims. (Cl. 205—8)

This invention relates to the manufacture of electric cables and deals particularly with the application of the sheath by the method of pulling the cable body into an oversized tube and then drawing down the tube to make it an appropriate fit on the cable body inside it. This method is usually adopted at the present time only for sheaths of aluminum or aluminum alloy. The method comprises the steps of laying the tube out, pulling the cable body into the tube and then drawing down the tube. During the last step the cable body is initially substantially longer than the tube, but as the reduction in diameter proceeds the tube is elongated so as to cover the remainder of the cable body.

The present invention deals with the protection and guidance of any part of the cable body which occupies a position in which it is not enclosed in the tube. When the cable body has been pulled into the tube and one of its ends connected to the end of the tube adjacent the die (hereinafter referred to as the leading end of the tube), so that the drawing may commence, there is a tail of cable body projecting from the trailing end of the tube equal in length to the elongation of the tube which is to be produced. This projecting length may be of the order of 10–100 yards and gradually diminishes as the elongation of the tube proceeds. At the same time the tail of the cable body moves forward and finally disappears into the tube at the point in the path of movement close to the tube drawing die.

The present invention provides a method and means for protecting and guiding the part of the cable body which at any time in the cycle of operations lies outside the tube. This protecting and guiding means consists of a casing of sufficient diameter inside to permit the free sliding of the cable body along it and of sufficient length to cover the part of the cable which lies between the drum and the end of the tube. This casing is attachable to the end of the tube and can travel forward with it. It may be constructed so as to be readily variable in length by the addition or removal of sections or by telescoping sections or otherwise and the tube or each section may be split longitudinally so as to facilitate the placing in position and removal of the casing without interfering with the working of the cycle.

The function of the casing is to protect the outer part of the cable body, which may consist mainly of paper, from being injured or contaminated while it is passing into the tube which is to form its sheath. A further function is to guide the movement of that part of the cable by limiting possible lateral displacement from the required path. There are several possible methods of using the protective casing, depending mainly on the steps in the cycle of manufacturing operations.

There are at present two alternative procedures in view for the method of manufacture in which the invention is employed. One of these may be described as the direct procedure and the other as the reciprocating procedure. In the first of these the movements of the tube and cable body, both when being laid out and when being drawn down, are always in the same sense. In the second the laying out proceeds in one sense and the drawing down in the reverse sense. In each case an elongated support is provided having rollers or guides as necessary to permit of the laying out of the tube length and of the cable body within it. This support is preferably straight but it may have one or more curves in it of sufficiently large radius to permit the laying out of the tube and subsequent operations to be carried out. The end of the support at which the reducing die is situated will hereinafter be referred to as the "forward end." In the direct procedure the unenclosed tail of the cable body is that part of the body which has not been drawn into the tube. In the reciprocating procedure this tail is part of the body which has been drawn through the tube and made to project along the support from the end of the tube which becomes the trailing end during the drawing down operation when the movement of the tube and body takes place in the reverse sense.

In some cases it is practicable to use a casing formed in one piece which is pulled into position on the support at the same time as the tube and then attached to the trailing end of the tube.

If in the direct procedure the cycle of operations includes the step of drawing forward a cable body from its drum so that it follows closely the end of the tube as this is being drawn from the support through the reducing die, the casing will be made in sections, the first section being attached directly to the rear end of the tube and following sections being added as the space between the end of the tube and the cable drum increases, each length being coupled to the one preceding it so that it is drawn forward along with it. In some cases it is advantageous to use a sectional construction of the casing to permit it to be detached piece by piece as the length of the tail remaining outside the tube decreases.

In all cases the casing travels forward as a continuation of the tube and is detached from it as the end of the tube approaches the drawing die. It is then returned to the other end of the support for use in a subsequent cycle either before or during the laying out of another tube.

An example of a method of constructing the casing in sections and two examples of methods of sheathing cables by the reciprocating process utilising different forms of tubular casing will hereinafter be described with reference to the accompanying drawings. In these drawings—

Figure 1 is an elevation of part of a tubular casing made up from a number of sections and attached to the end of a metal tube.

Figure 2 is a sectional elevation of part of the casing and

Figure 3 is a cross-section on line III—III in Figure 2,

Figures 4, 5 and 6 are diagrammatic drawings showing three steps in one of the reciprocating processes and Figures 7 and 8 are diagrammatic drawings of two steps in a second reciprocating process.

Referring to Figures 1, 2 and 3 of the accompanying drawings the casing is made in sections of appropriate length, say from 6 feet to 10 feet, convenient for handling and each section consists of two half tubes 1 and 2 hinged together by spring loaded hinges 3 so that the section may be opened for slipping laterally over the cable body. The first of the sections has attached to its leading end a connecting link 4, the forward end of which is attached to a clip 5 which is passed round and caused to grip the end of the tube 6. This tube end is belled out to give additional security of attachment as well as facilitating the entry of the cable body into the tube. The casing is of somewhat larger diameter internally than the tube 6, so as to provide for ease of application to the cable body and freedom of movement of the body along the casing. The sections are coupled end to end by means comprising on the leading end of a section two half rings 7, 8, which combine to form a socket which will embrace the trailing end of the preceding section and on this trailing end are projecting pins 9, 10 and 11 which fit into circumferentially running slots 12 in the two half rings 7, 8.

One method of sheathing an electric cable by a reciprocating process utilising a tubular casing of the kind described with reference to Figures 1, 2 and 3 of the drawings will now be described with reference to Figures 4, 5 and 6. The first step in this process is the drawing of a length of aluminium tube 13 from a supply drum 14 through a straightening die 15 onto an elongated support indicated diagrammatically in the drawings by 16, 17. This support may be about ¼ mile long. Parts are cut away in the drawings.

The support 16, 17 is preferably straight but may have in it some curves of a radius sufficiently large to avoid damaging the pipe and to enable the subsequent operations to be carried out as will be described. It may consist for example of a horizontal rigid frame-work carrying a number of horizontal rollers for supporting the tube arranged with their axes transverse to the axis of the tube and a number of vertical rollers arranged on either side of the centre line of the support at less frequent intervals than the horizontal rollers, their function being to prevent the tube from falling from the support. Where the support is curved, vertical rollers at more frequent intervals will be required on the inside of the curve to maintain the tube on the support. The tube 13 is pulled onto the support by means of a hawser 18 which passes over a fixed pulley 19 onto the drum 20 which is driven from a source of power not shown. The end of the tube 13 may be attached to the hawser 6 by crimping down the tube onto a tow-bar 21 in the manner described in copending application United Kingdom No. 3,384/50 dated September 2, 1950. In Figure 4 of the drawings, a sufficient length of the tube has been laid out on the support and while the hawser 18 is still attached to the end of the tube 13, a tubular casing has been built up from a plurality of sections, of which sections 22 and 23 can be seen adjacent to the trailing end of the tube 13.

Referring now to Figure 5. Here both ends of the length of tube 13 laid out on the support 16, 17 have been cut. The end adjacent to section 22 of the tubular casing, that is the trailing end, has been cut off to release the end of the hawser 18 and the end adjacent to a reducing die 24, that is the leading end, has been cut so that the surplus tube on the supply drum 14 and lying between the supply drum 14 and the end 16 of the support can be removed. In Figure 5 the supply drum 14 has been replaced by a drum 25 carrying a cable body 26.

In Figure 5 a second hawser 27 of smaller size than the hawser 18 and hereinafter called the "tow line" 27 is shown in the process of being inserted in the tube 13. The tow line 27 is carried on a supply drum 32. The end of the tow line 27 is attached to a plunger 28 which fits freely into the tube 13 and is being blown through the tube by means of compressed air supplied by a compressor 29. During this process the tube 13 is prevented from moving along the support by a ring 30 fixed to the support. The end of the tube is belled out so that it will not pass through the ring 30. The ring 30 may conveniently form part of the coupling between the air supply tube 31 and the end of the tube 13. When the plunger 28 reaches the end of the tube 13, adjacent to the tubular casing, it is removed from the tow line 27 and then it is connected to the free end of the hawser 18. The opposite end of the tow line 27 is now taken from the supply drum 32 and connected to the end of the cable body 26. The drum 20 is again driven to take up the hawser 18 and pull the cable body 26 into the tube 13 and the tubular casing. The combined lengths of the tube 13 and the tubular casing are equal to, or greater than, the length of the cable body 26 so that when the end of the cable body 26, opposite to that attached to the tow line 27, reaches the leading end of the tube 13 the cable body 26 is wholly within the tube 13 and the tubular casing. During or before this operation, the end of the tubular casing, adjacent to the end of the tube, is attached to the tube in the manner described with reference to Figures 1, 2 and 3 by means of a link 33. The leading end of the cable body 26 and the leading end of the tube 13 are now attached to a short length of hawser 34 (Figure 6), the other end of which is wound onto a drum 35 which has been placed in the position formerly occupied by the drum 20. This hawser also passes once round a capstan 36 and through a reducing die 24.

The drum 35 and the capstan 36 are now rotated so as to draw the tube 13 containing the cable body 26 from the support 16, 17 through the reducing die 24 (Figure 6). The reducing die 24 is of a size such that the diameter of the tube 13 is reduced to an extent such that the cable body 26 is a sufficiently tight fit within it. When the trailing end of the tube 13 (attached to the tubular casing) approaches the reducing die 24 the tubular casing is detached from it and the drawing down of the tube 13 to sheath the cable body is completed. The length of tube 13 laid out on the support 16, 17 is such that on completion of the drawing down operation the whole of the cable body 26 has been sheathed.

During the drawing down operation the length of the cable body which projects from the tube 13 into the tubular casing is progressively reduced as the trailing end of the tube approaches the forward end of the support. During this operation the end of the cable body remains attached to the tow line 27 which is itself attached to the hawser 18; hence the hawser 18 is unwound from the drum 20 as the tube 13 is drawn from the support. If necessary, braking may be applied to the drum 20 during this operation with the object of keeping the cable body extended. Finally the sections of the tubular casing are returned to the end 17 of the support ready for a further sheathing operation.

Figures 7 and 8 show two steps in an alternate reciprocating method in which the protective tubular casing consists of a single length of metal tube 37 of a diameter slightly greater than the diameter of the tube 13. In Figure 7, a length of tube 13 is shown in the process of being drawn onto the support 16, 17 from a supply drum 14 through a straightening die 15. As in the process described in Figures 4 to 6, the tube 13 is pulled onto the support by means of a hawser 18 passing over a fixed pulley 19. The hawser 18 being coupled to the end of the tube 13 by crimping the tube over a tow-bar 21 in the manner described in co-pending United Kingdom application No. 3,384/50 dated September 2, 1950. In this method however the protective metal tube 37 is pulled onto the support 16, 17 at the same time as the tube 13. At the start of the operation the protective tube 37 is located at the forward end 16 of the support and the hawser 18 is passed through it. During the connection of the hawser 18 to the end of the tube 13, a cylindrical metal block 38 is slipped over the end of the tow-bar 21 with its rounded end away from the end of the tube 13. The outside diameter of the block 38 is slightly greater than the internal diameter of the protective tube 37. The end of the protective tube 37 adjacent to the end of the tube 13 is belled out. As the tube 13 is being pulled onto the support, the block 38 bears against the belled out end of the protective tube 37 and thus pushes it onto the support ahead of the tube 13. When a sufficient length of the tube 13 is on the support, its crimped end is cut off to disconnect it from the hawser 18. The end of the tube 13 is belled out in a similar manner to the end of the protective tube 37. A tow line 27 is inserted through the tube 13 in a similar manner to that shown in Figure 5 and the end of this tow line is connected to the end of the hawser 18. The belled out ends of the tubes 13 and 37 are now connected together in such a manner that there will be a free passage through the connection for the cable body. A simple method of making this connection is to apply a lapping of cotton tape round the ends of the two tubes and to reinforce this lapping by means of a wire binding. Alternatively a connection in the form of two clips and a link similar to clip 5 and link 4 shown in Figure 1 may be used. The connection is indicated by the reference 39 in Figure 8.

A cable body is now pulled into the tubes 13 and 37 by means of the tow line 27 and the hawser 18 until one end of the cable body is adjacent to the leading end of the tube 13 at the forward end 16 of the support. The method proceeds in the same manner as the method described with reference to Figures 5, 6 and 7, the leading end of the tube 13 and the end of the cable body being connected to a short length of hawser 34 which passes from a take-up drum 35, once round the capstan 36, through the reducing die 24 and is connected to the cable body and tube by a tow-bar, for example in the manner described in co-pending United Kingdom application No. 3,384/50 dated September 2, 1950.

Figure 8 shows the tube 13 being drawn through the reducing die 24 from the support. It will be seen that when this operation is completed and the sheathed cable body has been wound completely on the drum 35, the protective tube 37 will remain in position at the forward end of the support 16, 17 with the tow line 27 passing through it. By means of the tow line 27, it is then possible to pull the hawser 18 back through the protective tube 37 to bring it into position ready to be used for pulling a further length of tubing onto the support.

The process described with reference to Figures 7 and 8 has the advantage that the tubular casing is always returned to the forward end of the support after each length of cable has been sheathed and that the only operations which need be carried out by an operator not located at or near the forward end of the support are the disconnection of the tow line 27 from the trailing end of the tube 13, the connection of the tow line 27 to the hawser 18 at the trailing end of the tube 13 and the coupling together of the ends of the tubes 13 and 37.

What I claim as my invention is:

1. A method of sheathing an electric cable body which comprises attaching a length of metal tube and a tubular casing to a hawser, taking up said hawser until said tube lies wholly on an elongated support with one end at the forward end of said support and the other end adjacent to an end of said casing and said casing lies on the support coaxially with said tube, passing a second hawser through said tube, attaching said hawsers together and taking up said hawsers to pull said cable body wholly into said tube and casing, attaching an end of said cable body to the forward end of said tube, attaching said casing to said tube and drawing said tube through a reducing device located at the forward end of said support to elongate it and reduce its diameter, the combined lengths of said tube and casing being at least equal to the length of said cable body.

2. A method of sheathing an electric cable body which comprises arranging a tubular casing, a length of metal tube and said cable body in aligned relation, with the tubular casing at one end (the forward end) of an elongated support, the combined lengths of said tube and casing being at least equal to the length of said cable body, pulling said casing and tube, by its trailing end, and said casing on to said support until said tube and casing lie wholly on said support with the leading end of the tube at the forward end of the support and the trailing end of the tube adjacent to and coaxial with an end of said casing, pulling said cable body by its trailing end wholly into said tube and casing, attaching the leading end of said cable body to the leading end of said tube, securing the casing to the trailing end of said tube and drawing said tube by its leading end through a reducing device at the forward end of said support to elongate it and reduce its diameter.

References Cited in the file of this patent

UNITED STATES PATENTS

| Number | Name | Date |
|---|---|---|
| 182,485 | Saul | Sept. 19, 1876 |
| 2,132,258 | Elmer | Oct. 4, 1938 |
| 2,308,120 | Staples et al. | Jan. 12, 1943 |
| 2,386,119 | Jack | Oct. 2, 1945 |

FOREIGN PATENTS

| Number | Country | Date |
|---|---|---|
| 627,815 | Great Britain | Aug. 16, 1949 |